INVENTORS:
ALFRED EBERT
ERNST PIROT
FRITZ HOLLER
GEORG STEINHILBER

INVENTORS:
ALFRED EBERT
ERNST PIROT
FRITZ HOLLER
GEORG STEINHILBER

United States Patent Office 3,544,667
Patented Dec. 1, 1970

3,544,667
PROCESS FOR BIAXIALLY STRETCHING THERMOPLASTIC TUBULAR FILM
Alfred Ebert and Ernst Pirot, Wuppertal-Barmen, Fritz Holler, Wuppertal-Langerfeld, and Georg Steinhilber, Wuppertal-Elberfeld, Germany, assignors to J. P. Bemberg Aktiengesellschaft, Wuppertal, Germany
Filed Feb. 2, 1968, Ser. No. 702,733
Claims priority, application Germany, Feb. 10, 1967, B 91,113; Aug. 9, 1967, B 93,882; Jan. 8, 1968, B 96,135, B 96,136, B 96,137, B 96,138
Int. Cl. B29c 17/00, 17/07, 25/00
U.S. Cl. 264—89
15 Claims

ABSTRACT OF THE DISCLOSURE

Process wherein an extruded seamless thermoplastic tubular film is biaxially stretched by a longitudinal drawing accompanied by an inflation or blowing for transverse stretch. After first inflating the initially extruded film tube under a counterpressure of an externally applied cooling gas in a pressure chamber, the tubular film is necked down from the pressure chamber to pass through an elongated pipe having at least a first cooling section of reduced surface contact with the tubular film, after which the tubular film is reheated for further inflation and/or longitudinal stretching and may then be subsequently tempered to achieve uniform and/or stable dimensions. The resulting inflated and biaxially stretched tube is collapsed or flattened and collected on a take-up roll in the usual manner.

---

This invention is concerned with an improved process for biaxially stretching a seamless tubular film of a thermoplastic polymer by first extruding the tube from an annular die slot or so-called "ring nozzle" and then drawing the tube at a rate which is ordinarily faster than its speed of extrusion, e.g. through a pair of pinch rollers spaced at a distance from the point of extrusion and adapted to collapse the tube and seal it against substantial loss of air, while injecting air into the tube to blow or inflate it at a point where it is heated to permit transverse stretching together with a longitudinal stretch imparted by drawing or providing tension in a longitudinal direction. More particularly, the invention is concerned with an improvement in process steps in an otherwise generally known process in which the extruded thermoplastic tube is first cooled in a pressure zone where inflation has previously been avoided and the tube is then subsequently heated and inflated in a second zone to provide the desired biaxial stretching. The improvement herein is directed to a number of novel variations of this stretching process.

In general, processes are known where a tubular film is produced merely by drawing and inflating a thermoplastic polymer as it emerges in a hot or warm stretchable state from the annular die slot of the extruder. This simple type of process, however, results only in a deformation of the tube rather than a desirable orientation of the molecules. In order to achieve a biaxial stretching and orientation of the polymer molecules, it has been suggested that an initially extruded and cooled tube be passed through a heated pair of rollers and then inflated while being stretched. In this case, the air used for blowing or inflation of the tube is introduced by means of injection between two pairs of pressing rolls, for example with a probe or other small conduit for the air. However, this process and the required apparatus present many difficulties and lead to losses of the film.

In order to avoid two sets or pairs of press rolls or pinch rolls and the undesirable injection of air between such roller pairs, it is possible to improve the biaxial stretching of the tubular film at an elevated temperature by injecting or blowing air into the tube through an opening in the center or central portion of the annular die slot, the inflated tube subsequently being collapsed between a pair of unheated press or pinch rolls which may also serve to draw the film for longitudinal stretching.

In one known process, it is considered to be advisable to avoid an initial expansion or inflation of the film tube by having the molten thermoplastic emerge from the annular die slot into a pressure chamber in which there is maintained a controlled counterpressure which opposes the inflating pressure of the air within the tube. The transverse stretching then takes place only in a subsequent heating chamber where expansion or inflation of the tube is permitted to occur under substantially atmospheric pressure, after the tube has passed from the pressure chamber through a pipe or tubular conduit having a highly polished inner wall. The film tube lies against this inner wall so as to preserve the elevated pressure in the pressure chamber.

Although this application of a counterpressure on the initially extruded tube offers certain advantages in the biaxial stretching process, difficulties frequently arise in its practical application, especially in the case of thermoplastic polymers which tend to be sticky or tacky. For example, the films produced at the beginning of a production run tend to exhibit physical properties which are markedly different from those at the end of the same production run. With a number of polymer films, e.g. polyvinyl chloride (PVC) which has a relatively high content of a plasticizer, difficulties are caused by the film sticking to the polished wall of the pipe. Another problem arises due to the fact that the biaxially stretched tube after passing through the heating chamber tends to pulsate, with a corresponding negative influence on the stretching process and a decided impairment of film quality.

One object of the present invention is to avoid the difficulties in the processes previously employed in the biaxial stretching of extruded tubular thermoplastic films so as to provide an improved and comparably smooth processing technique yielding a film product of high quality and uniform properties.

Another object of the invention is to provide a process for biaxially stretching tubular thermoplastic films which is readily adapted to a wide variety of film-forming synthetic high molecular weight polymers and which is particularly useful with polymers such as polyvinylchloride, vinyl chloride copolymers, polyethylene and polypropylene where the presence of plasticizers and/or a relatively low melting point of the polymer has presented extremely difficult problems.

Still another object of the invention is to provide a process for biaxially stretching the extruded tubular film whereby process conditions can be more easily adapted to the requirements of individual polymers and adjustments can be easily made to influence the desired dimensions and properties of the blown film.

Yet another object of the invention is to provide processes which permit a stretching or orientation of the tubular film predominately in either the longitudinal or transverse direction.

Another object of the invention is to provide processing steps to more accurately control the dimensions of the tubular film as it is being processed and to impart a higher dimensional uniformity and stability to the finished film product.

Thus, it has now been found in accordance with the present invention that these and other objects and advantages are achieved by following the known procedure of subjecting the film tube to transverse stretching by controlled inflation with a gas entering the film tube centrally of its extrusion point and to longitudinal stretching by drawing the extruded film tube through pinch rolls which also flatten the tube at a spaced distance from the point of extrusion in order to close the tube for inflation, provided that the initially extruded tubular film is first inflated in an enclosed pressure zone through which a cooling gas is circulated externally of the film tube under a counterpressure sufficient to limit the inflation of the film tube, e.g. up to about three times its extrusion diameter, and is then necked down from the pressure zone through an elongated tubular passageway having at least a first stage where the tubular film is further cooled while reducing its surface contact and adhesion to the inner wall of the passageway, subsequently reheating the film tube before it is flattened and stretching the reheated tube in at least one of its longitudinal and transverse directions, and finally collecting the stretched and flattened film tube.

In a particularly preferred embodiment of the invention for the production of a tubular film which has been strongly stretched or oriented in both its longitudinal and transverse directions, the initially extruded film tube is slightly preinflated in the pressure zone, preferably about 1.2 up to a maximum of 3 times its initial extrusion diameter, and is then further inflated while being heated in a second inflation zone under a substantially atmospheric pressure, the tubular passageway interconnecting the pressure zone with the second inflation zone and the film tube being treated in this passageway in three stages consisting of:

(a) The first stage as described above where the tubular film is cooled, (b) A second stage where braking pressure is applied to the tubular film through the wall surface of the passageway, and (c) A third stage where the tubular film is preheated prior to emergence into the second inflation zone, preferably while again reducing its surface contact and adhesion to the inner wall of the passageway.

On the other hand, with only slight variations in the processing steps and only a few if any changes in the apparatus, it is also possible to produce a tubular film which is predominately oriented in either its longitudinal or its transverse direction as described in greater detail below.

In general, some preliminary testing is desirable with specific thermoplastic polymers to determine the optimum amount of inflation of the film tube in the pressure zone as well as other process conditions. However, in order to achieve the best results and a smooth and trouble-free running of the tubular film throughout the process, there are certain parameters which should be observed.

For example, it is essential for purposes of the invention to "neck down" the initially inflated extruded tube as it passes from the pressure zone or chamber into the elongated pipe or passageway in which the tube is first cooled and then transported for subsequent heating and stretching. In other words, the maximum or inflated diameter of the film tube in the pressure zone must be larger than the diameter of the elongated tubular pipe of passageway, e.g. up to approximately 10% larger. In general this pipe diameter will usually fall someplace between the diameter of the annular die slot and the diameter of the inflated film tube, most advantageously such that the maximum diameter of the film tube at this point is approximately 5 to 10% greater than the pipe diameter. It is also advantageous to position the interconnecting pipe or passageway sufficiently close to the face of the extrusion die so that the length of the tube as it is preinflated in the pressure zone does not substantially exceed the maximum diameter of the preinflated tube. In other words, the length of the tubular film in the pressure zone is preferably less than its maximum diameter in this zone.

It is also important to maintain and control the desired maximum diameter of the film tube in the pressure zone so constant that it does not flucuate beyond a minimum amount e.g. within limits of ±3% and preferably not more than ±2. The compressed gas, e.g. air, introduced externally of the film tube in the pressure zone has a double function in that it must not only limit the diameter of the film tube but must also cool the tube which emerges from the annular die slot at a relatively high temperature. For this reason, the necessary amounts of air, e.g. where the extruded film tube has a large diameter and/or large wall thickness, can be proportionately high. In such cases, a fluctuation can arise in the pressure zone which is quite harmful to the still sensitive tubular film. Also, the intentional regulation of the pressure in response to variations in the film tube diameter then tends to operate too slowly. It has been found that an especially satisfactory transport or conduction of the film tube occurs and a rapid regulation of the pressure takes place so as to ensure a constant film tube diameter if the air is supplied to the pressure chamber through at least six separate but equally strong streams or inlet channels and is withdrawn in the same manner through an approximately equal number of separate streams of equal throughput. The pressure is then regulated by supplying additional air for the cooling air stream when the film tube diameter increases over the regulated or desired value or by exhausting additional air from the air stream as it leaves the pressure chamber when the film tube diameter decreases below the regulated value. This particular improvement is likewise described in greater detail hereinafter.

The improvement in the apparatus of the invention is particularly directed to the construction and arrangement of the pressure chamber and the elongated pipe connected thereto. Thus, this elongated pipe should ordinarily have a diameter which is greater than the diameter of the annular die slot, preferably up to about 3 times greater, but at the same time its diameter must be slightly smaller than the maximum diameter of the preinflated tube in the pressure chamber, and the pipe should be arranged coaxially with the tube being drawn therethrough for partial peripheral contact of the tube with the inner walls of the pipe in at least two successive stages or sections including:

(a) A first section in which the inner wall of the pipe is roughened and/or grooved to substantially reduce the area of surface contact with the tube and means associated with this first section to cool its inner wall, e.g. a jacket or shell through which a fluid cooling medium can be conveyed for indirect cooling, and (b) A subsequent section which is preferably roughened in the same manner as the first section and which is associated with means to heat its inner wall.

These essential features of the invention as well as certain preferred features or embodiments of the process and apparatus are explained in greater detail with the aid of the accompanying drawing in which.

Figure 1:
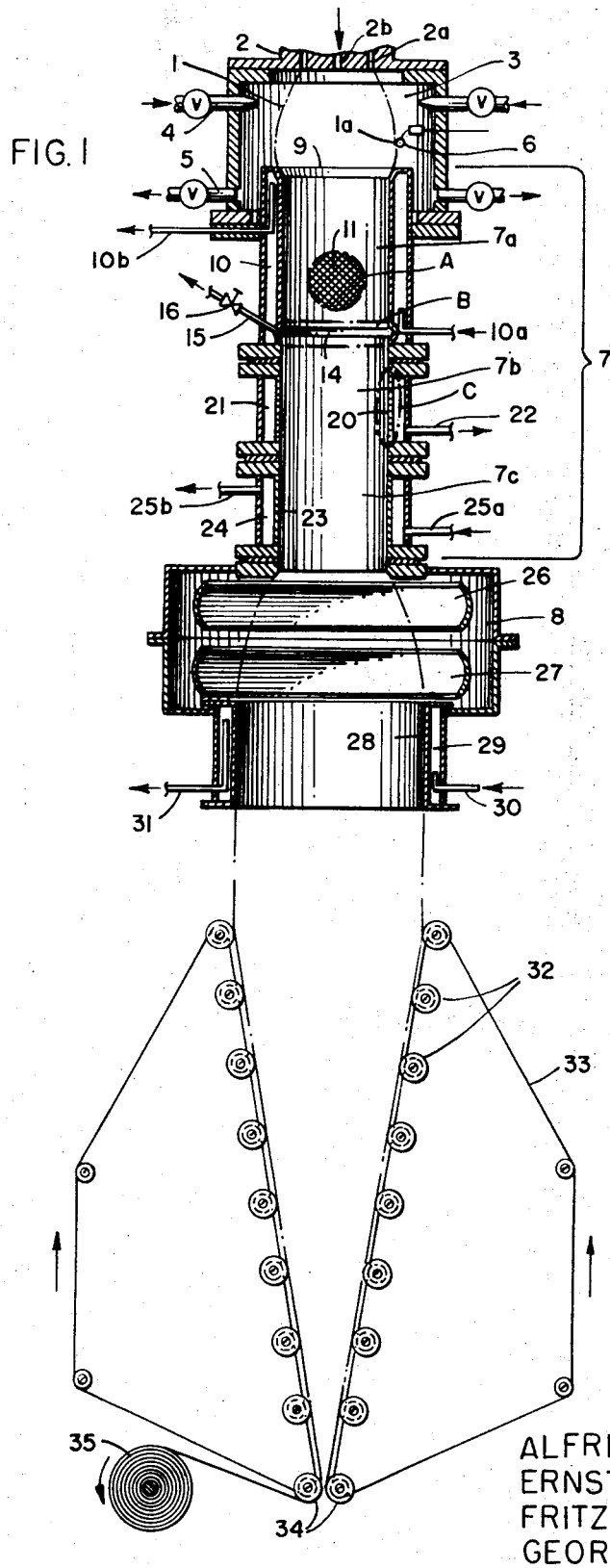
FIG. 1 is a cross-sectional and partly schematic view of one preferred embodiment of the entire apparatus, certain conventional portions thereof being shown only in part of simply omitted, it being understood that the apparatus need not be arranged in vertical position as shown with reference to the direction in which the tubular film is extruded and drawn.
Figure 7:
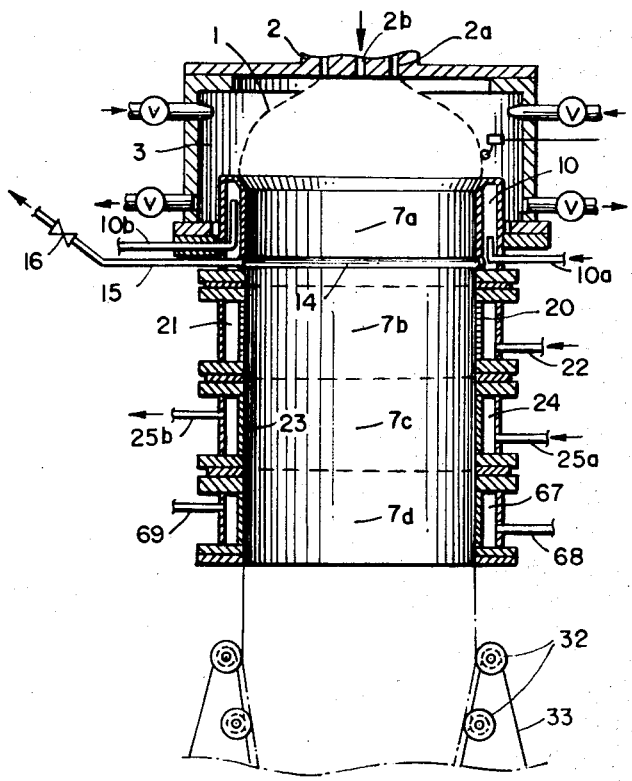
Figure 8:
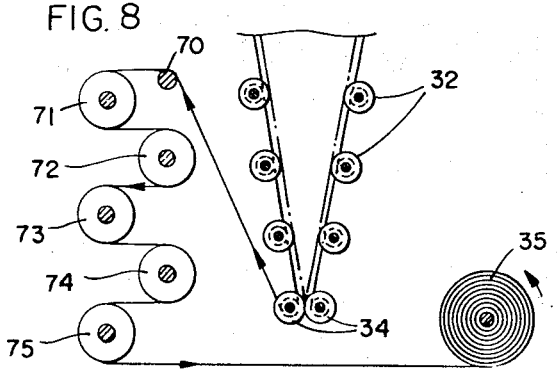

FIG. 7 is a cross-sectional and partly schematic view of another embodiment of the apparatus similar to FIG. 1 but in which the elongated pipe extends from the pressure chamber to about the point at which the tube starts to collapse; and FIG. 8 is a schematic view of a preferred apparatus arranged between the pinch rolls and a take-up device for the purpose of reducing the after-shrinkage of the film.

Referring first to the general arrangement of the apparatus as shown in FIG. 1 which is used to impart a strong biaxial stretching in both longitudinal and transverse directions, the molten thermoplastic polymer is first extruded in the form of a seamless tube 1 through the usual annular die slot 2a of a conventional screw extruder 2 so as to emerge into a pressure chamber 3 having one or more nozzles 4 for injecting compressed cooling air and one or more discharge openings or conduits 5 so that the cooling air circulates through the pressure chamber. Both the inlet nozzles 4 and the outlets 5 are provided with suitable control valves to adjust the pressure in chamber 3. An opening, bore or orifice 2b located centrally within the annular slot in the face of the extruder die 2 permits the injection of air for inflation of the tube. By means of any suitable sensor or conventional actuating element 6 equipped with relays to the valve controls of inlets 4 and outlets 5, the counterpressure of the air externally of the tube in chamber 3 can be controlled to limit the maximum diameter of the tube at point 1a and maintain this diameter at a substantially constant value.

An elongated pipe of several sections as indicated by reference numeral 7 extends from the pressure chamber 3 to a heating chamber 8 and the film tube 1 is necked down and drawn through this pipe 7 for inflation in the heating chamber. This elongated pipe preferably has a diameter which is up to 3 times larger than the diameter of the annular die slot 2a so as to correspond to the increased diameter of the preinflated tubular film without quite reaching this preinflated tube diameter, preferably being about 5–10% smaller than the maximum film tube diameter at this point.

The first pipe section 7a, which is removably mounted to the pressure chamber 3 by any conventional flange connection, preferably extends inwardly of the pressure zone as shown in FIG. 1 so that its annular rim 9 receiving the slightly preinflated tube is positioned at a relatively short distance from the face of the extruder die 2, this distance being advantageously no greater than the maximum diameter of the preinflated tube in the pressure zone 3. A cooling jacket or shell 10 is placed around the first pipe section 7a and has suitable inlet means 10a and outlet means 10b for circulation of a cooling fluid, e.g. water, in the annular space around the inner pipe wall 11. The tube 1 is thereby cooled in the first pipe section 7a by partial peripheral contact with the inner pipe wall 11.

The inner wall 11 of the first pipe section 7a has a roughened surface, e.g. by abrasion with sand jets, so that the depth of surface roughening is at least 30 microns, advantageously about 35 to 55 microns, where there is no other alteration in the surface construction. Burrs or other sharp edges on this surface should be avoided, for example by smoothing them off with sandpaper or any similar treatment which does not reduce the required depth of roughening. Such sharp edges otherwise have a tendency to damage the surface of the tubular film. The term "roughened surface" is employed herein (1) with its precise technical meaning as a fine pattern of surface irregularities as may result from the initial casting of the pipe section or by shaping, sand blasting, turning or grinding processes, but also (2) with its general meaning of any surface which has even larger interruptions or gap spaces recessed therein, e.g. as obtained by a regular pattern of grooves, notches, serrations or the like. In either case, however, it is desirable to avoid sharp edges or corners which may damage the film.

In general, it is desirable to provide a surface roughness which reduces direct contact of the tubular film with the inner wall 11 by a substantial amount, e.g. by at least one-tenth and preferably at least one-quarter to one-half or even more. The tube 1 thus tends to ride only on the "high" portions of the roughened wall surface or can even be lifted slightly from the wall surface by means of a thin layer of air as explained more fully below.

Figure 2:
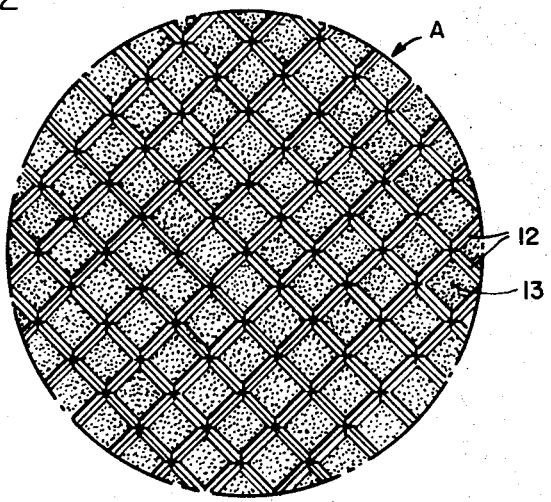
FIG. 2 is an enlarged view of a portion A of the grooved inner wall surface of the first section of the elongated pipe shown in FIG. 1.

A particularly advantageous embodiment of this first pipe section 7a is illustrated in FIG. 2 where an enlarged view of portion A of the inner wall 11 is shown for greater detail. Thus, series of crossed spiral grooves 12 can be cut into this inner wall so as to extend over the entire length of the first pipe section. These grooves, for example, may have dimensions of 8 mm. in width and 0.6 mm. deep. The remaining portion of the wall can thereby be cut by the grooves into rhombic surfaces 13 whose sides measure about 3 to 8 mm. by way of example. FIG. 2 merely represents such spiral grooves spaced 8 mm. apart and having said dimensions of 8 x 0.6 mm. Other patterns and dimensions of the grooves or similar notched or cut recesses are also feasible, but it has proven to be especially advantageous if such grooves provide a plurality of fluid channels along the inner wall from the pressure chamber 3 to the opposite end of the first pipe section 7a.

Figure 3:
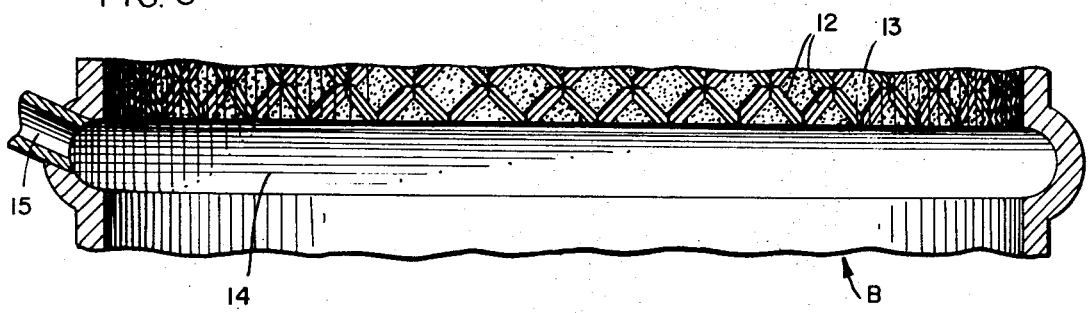
FIG. 3 is an enlarged view of the junction B between the first and second sections of the elongated pipe shown in FIG. 1.

With such grooves 12, a small amount of air can be permitted to flow therethrough between the tubular film 1 and the inner wall 11 so as to slightly depress the film tube inwardly away from the wall. The amount of air flowing in the grooves or channels 12 is regulated as shown in greater detail in FIG. 3 which is an enlarged view of the terminal end of the first pipe section 7a. Thus, by providing an annular recess or groove 14 at the end of this first section in fluid communication with the spiral grooves 12, air can be withdrawn through one or more outlets 15 having adjustable valves 16. This grooved construction in combination with a controlled flow of air around the tubular film permits the ungrooved wall surfaces 13 to have a surface roughness of even less than 30 microns. Of course, with only a few grooves or widely spaced grooves, it is again advisable to increase surface roughness, e.g. by abrasion, to values above 30 microns. By employing both a surface roughening and grooving of the inner wall of section 7a, the flow of air around the tubular film is especially uniform and easily controlled.

The second section 7b of the interconnecting pipe can be constructed in various ways to exert a braking pressure or frictional drag on the tubular film as described more fully below. A particularly desirable embodiment of this section is illustrated by the enlarged cross-sectional view of the inner wall in FIG. 4. The outermost portion 17 of this inner wall consists of a porous material, e.g. sintered metal, or some other air-permeable structure, e.g. a perforated metal shell, which is then lined with a textile material in the form of a fabric backing 18 having a raised or napped inner surface 19. As further shown in FIG. 1, the inner wall 20 is encased by a jacket 21 to provide an annular space which can be placed under a vacuum by connecting line 22. The vacuum is spread evenly by the plush textile lining which in turn exerts the desired braking pressure or longitudinal tension on the tubular film.

The third pipe section 7c has an inner wall 23 encased by a jacket or shell 24 with inlet 25a and outlet 25b for circulation of a heating fluid around the inner wall. The surface roughening of the inner wall 23 to a depth of less than 30 microns is sufficient in this case, because the tubular film has been cooled and braked in the previous sections and preheating in this third section can be controlled to avoid any softening of the film.

A heating chamber 8 is mounted to enclose the tube 1 as it emerges from the last pipe section 7c. Heating can be accomplished with conventional means, e.g. by infrared rays from heating elements 26 and 27. In general, it is desirable to maintain a higher temperature in the upper portion of the heating chamber with elements 26 as compared to the lower portion. The heating chamber is normally maintained under atmospheric pressure so that the tube 1 is inflated to achieve the required transverse stretching.

A calibrating sleeve 28 with shell 29 is preferably positioned around the inflated tube after the heating chamber, and the inlet 30 and outlet 31 permit either a heating or cooling medium to be circulated in the shell 29 in order to temper the film tube and ensure a uniform diameter and/or uniform properties of the stretched film.

Conventional apparatus is then provided to collapse or flatten the fully inflated tube, e.g. by using a series of paired rollers 32 driven on each side by an endless belt or band 33. The flattening of the tube is completed by a pair of pinch rolls 34 which close the tube against the air pressure necessary for inflation and which also exert the required pull or draw to stretch the tube in its longitudinal direction. The flat tube is then collected on the usual take-up spool 35 or similar winding device.

In order to avoid so-called "butt rings" in the finished film product, it is conventional to mount the take-up spool 35, the roller pairs 32 and 34 with their belt drive 33 and preferably also the calibrating sleeve 28 so that they can be turned slowly back and forth about the longitudinal axis of the film tube. This same effect can also be achieved, however, if the blowing head or extruder die with the annular slot executes this back and forth movement or revolves slowly about the longitudinal axis of the film tube while the rest of the apparatus remains stationary. In this latter case, the pressure chamber must be attached to the extruder by any suitable rotatable and pressure-tight connection, e.g. by means of a short cylindrical extension beyond the face of the extruder die jointed to the upper wall of the pressure chamber by a packed bearing as in the construction of a so-called "stuffing box."

The individual sections of the pipe 7 as well as the heating chamber 8 are advantageously joined together by easily separable flanges as indicated in FIG. 1, so that individual members can be interchanged to accommodate different thermoplastic materials and/or different dimensions as to the desired diameter and length of the tube being formed and stretched.

It will be evident from the working examples below that different thermoplastic polymers such as polyvinyl chloride and polypropylene have distinct properties which require corresponding variations in the dimensions of the apparatus, for example with reference to both diameters and lengths of individual elements of the apparatus. Further variations in dimensions depend upon such factors as the final diameter of the tubular film, its wall thickness and also the amount of polymer extruded per unit time. Optimum dimensions can be readily determined by simple trial experiments since the properties and behavior of film-forming polymers under biaxial stretching are well-known with respect to the amount of stretch, temperature of the film during stretching, standard film thicknesses and the like. Furthermore, the air pressures applied in the apparatus, the rate of cooling or heating of the film and the rate of extrusion and drawing can be easily manipulated during operation of the apparatus.

The ratio of the diameter of the elongated pipe 7 to the diameter of the annular die 2a is generally not critical. A smaller ratio of these diameters is advantageously chosen for thermoplastic materials having a high stretch factor as compared to those materials having a low stretch factor. The term "stretch factor" refers to the numerical value which specifies how many times the initially extruded thermoplastic film can be stretched with reference to its original unstretched length. By way of example, an especially favorable ratio for polypropylene (which has a stretch factor of about 6) has been found to be 1.5:1, while the best ratio for polyvinyl chloride (which has a stretch factor of about 2) has been found to be about 2:1. At a very small ratio of 1:1, e.g. with polypropylene, it is still possible to produce good tubular films, but a certain fluctuation appears in the tubular film which are noticeable in the way in which the tube moves. Also, with too large a ratio of over 3:1, e.g. with polyvinyl chloride, fluctuations are occasionally observed in the form of pulsations. Even though these fluctuations have no real influence on the process and do not diminish the quality of the resulting film, one usually attempts to achieve a smooth running of the blown film or foil, at least as some indication that the equipment is functioning properly. It has been established that such fluctuations are completely avoided if the ratio of the diameter of the elongated pipe to the diameter of the annular die slot lies between about 1.2:1 and 3:1, so that this range is deemed to be advantageous.

Merely by way of example, the following data can be given with the understanding that smaller and larger dimensions may also be used in appropriate cases:

|  | Mm. |
|---|---|
| Diameter of annular die slot | 100–150 |
| Diameter of interconnecting pipe | 120–300 |
| Length of first pipe section | 300–700 |
| Length of second pipe section | 100–300 |
| Length of third pipe section | 200–400 |
| Diameter of heating chamber | About 800 |
| Length of heating chamber | About 400 |
| Diameter of calibrating sleeve | 610 |
| Length of calibrating sleeve | 500 |

The exact dimensions of the calibrating sleeve naturally depend upon the fully inflated diameter of the tubular film, i.e. the desired amount of transverse stretch, and can therefore be varied widely from the single values given above. The dimensions of the other elements of the apparatus are generally valid for polymers having a relatively wide range of stretch factors.

In conjunction with the foregoing description of the apparatus, the process of the invention can be explained in greater detail as follows. It is again expressly stressed that numerical data is merely set forth by way of example because the method of treatment will vary with different thermoplastic materials, extrusion amounts and speeds, draw rates and the like as well as with the desired properties of the final film product.

It is essential for purposes of the invention to preinflate the initially extruded hot tubular film 1 to a diameter which is slightly larger than the diameter of the pipe 7 and to control this preinflated diameter by means of the counterpressure in the pressure chamber 3 within relatively narrow limits, e.g. ±2%. Otherwise, if the film tube acquires a preinflated diameter under the counteraction of the compressed air in chamber 3 which is equal to that of the diameter of pipe 7, e.g. as has occurred in known processes, there exists the danger that a relatively large amount of air will suddenly pass between the film tube and the pipe walls. A large loss of product would then occur, and it would be necessary to reinitiate the entire production run. On the other hand, the diameter of the pipe 7 must closely approximate the maximum film tube diameter so that the necking down of the tube 1 into the pipe 7 is not so excessive as to cause folds or other undesirable film deformation. Thus, the maximum diameter of the preinflated film tube in the pressure chamber is advantageously about 5–10% greater than the diameter of pipe 7. With this preinflation of the tube to a diameter slightly larger than the elongated pipe member, the film tube is brought into close surface contact with the entry to the first section 7a of the pipe so as to prevent any substantial loss or escape of air from the pressure chamber 3. It is especially advantageous if the first pipe section 7a extends or projects longitudinally into the pressure chamber 3 and presents an entry rim or edge 9 which is tapered or rounded radially inwardly to the required pipe diameter, thereby providing a smooth reception of the preinflated tube. The radial stability of the drawn tube is enhanced by positioning the receiving edge 9 of the first pipe section 7a at a distance from the face of the extruder 2 not more than the maximum diameter of the preinflated tube 1.

It is also important to maintain the maximum diameter of the tube at point 1a so constant that it does not fluctuate beyond a minimum amount, e.g. preferably within limits of ±2%. A greater fluctuation would of course tend to increase the possibility of breaking the air seal of the pressure chamber unless the tube were to be preinflated to a much larger maximum diameter with reference to the receiving pipe section 7a to accommodate such large fluctuations, in which case the danger of film deformation would also increase substantially. Such desired control of the preinflated tube diameter is readily achieved by the use of radially positioned sensors 6 or similar actuating elements responsive to variations in tube diameter so as to increase or decrease the counterpressure of air in pressure chamber 3.

In the first zone or pipe section 7a, the tubular film is cooled since this is essential for the improvement of the process. Cooling is sufficient to lower the temperature of the film at least below its softening range, i.e. so that the film is in the solid state and will tend to resist expansion until subsequently reheated. It is of course possible to impart a certain amount of precooling to the film by the compressed air injected into the pressure chamber 3 or by withdrawing heat from the molten thermoplastic material as it emerges from the extruder die. However, such measures should not be so strong as to interfere with the necessary preinflation of the extruded tube in the pressure chamber.

In spite of the cooling of the film tube in the first pipe section 7a by means of indirect heat transfer with a circulated cooling medium in shell 10, there still exists the danger that the film will strongly adhere to the inner wall of the pipe if one were to use a polished or smooth wall of the pipe. Thus, even a hardened or solid film tube is capable of adhering to a smooth surface just as two plates of glass can adhere to one another. Although wall adhesion can never be completely avoided, it is considered to be essential at this point of the biaxial stretching process to reduce such wall adhesion as much as possible. Accordingly, in combination with other features of the process, it has been found that a trouble-free tubular film production and stretching is possible provided that the inner wall of the first pipe zone or section 7a is roughened to a depth of at least 30 microns, preferably 40 microns or even more. The improvement which is achieved by this minimum roughening depth according to the invention can be explained in terms of the fact that some air from the pressure chamber 3 is permitted to penetrate between the pipe wall and the film tube so as to slightly depress the tube away from the wall, i.e. so that the tube rides on a layer of air rather than on the walls of the tube.

Especially good results have been achieved by permitting a controlled amount of air to pass from the pressure chamber or zone 3 to the annular recess 14 through the crossing spiral channels or grooves 12. In this case, the depth of surface roughening produced on the wall portions 13 by abrasion or the like can be reduced to about 30 microns or less, preferably to a depth of 10–20 microns.

Figure 4:
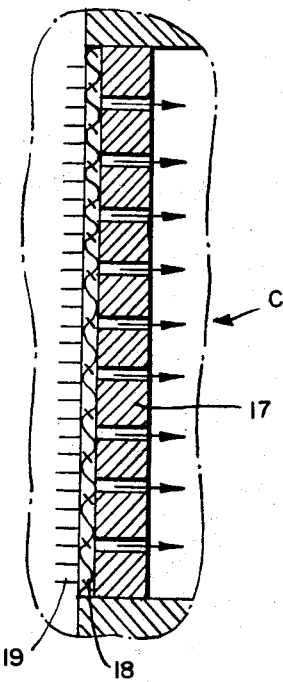
FIG. 4 is an enlarged view of the wall structure C of the second section of the elongated pipe shown in FIG. 1 illustrating the combined use of both a preferred textile lining material and a permeable wall structure for applying a braking pressure on the film tube.

The tubular film is placed under a braking pressure or frictional drag on the second pipe section 7b in order to achieve an exact longitudinal stretching. The film tube is neither heated nor cooled in this second pipe section. In order to provide a peripheral braking effect without causing damage to the tube, it is especially desirable to bring the outer wall surface of the tube into contact with a soft inner lining of the second pipe section in the form of a textile product, particularly a plush fabric with its raised, piled or napped surface facing inwardly for contact with the film tube. As indicated in FIG. 4, the base fabric 18 may be made of cotton while the pile 19 is composed of a polyester fiber (polyethylene terephthalate). Both the base fabric and the pile can consist entirely of such polyester fibers, or any other fibrous material including mixtures or various combination of fibers can be used since the cooled film tube has no tendency to stick to a textile material during this braking operation. Polyester fibers in at least the inner pile surface of the fabric liner are preferred because of their excellent stability. Also, by using a relatively stiff cut pile consisting of synthetic individual filaments of non-staple fibers, one achieves the greatest frictional resistance against the longitudinal movement of the tubular film and there are no staple or cut fibers which can be dislodged and carried along with the tubular film. The fabric liner should be applied to the outer cylindrical pipe structure as uniformly as possible, e.g. with any suitable adhesive at selected points or preferably by stretching the fabric and clamping it in place.

Another advantageous construction of the second pipe section 7b is achieved by perforating the inner wall 20 of this section or zone as shown in FIG. 1 and then adding a jacket or shell 21 in such a manner that the cylindrical interspace between the wall 20 and jacket 21 can be placed under a vacuum, e.g. through line 22. The holes or openings in the inner wall 20 should be small but numerous. The desired permeability of this inner wall 20 can also be achieved by using a pipe of sintered metal or any other air-permeable substance. The tubular film can lightly contact this permeable pipe wall structure itself, but it is especially advantageous to also line the permeable wall with the above mentioned textile material. This liner is especially useful in this case to achieve a very uniform vacuum distribution.

The braking force applied in the second pipe zone 7b can be adjusted by the level of the applied vacuum, e.g. from just a few millimeters to several centimeters of water column, as desired. The amount of vacuum is generally dependent on the type of thermoplastic polymer being treated, the thickness of the film tube and its drawing-off speed. This additional braking by means of a vacuum increases longitudinal shrinkage values by 10 to 20%.

In the third pipe section or zone 7c, there is a diminished tendency for the tubular film to adhere to the inner wall of the pipe so that its roughening depth can be reduced below 30 microns, e.g. to a depth of 5–20 microns. This third zone serves to preheat the film tube by means of any suitable fluid heating medium circulated through the jacket or shell 24. This preheating is preferably carried out so that the film tube attains a temperature upon its exit from the third zone whereby the most favorable shape or configuration of the tube takes place during biaxial stretching in the heating chamber 8. This shape or configuration under inflation of the tube corresponds to a short compact pear truncated at either end, e.g. substantially as shown in FIG. 1. If the temperature achieved by preheating is too low, the film tube enters the heating chamber with too small a diameter and the tube than then tends to pulsate. Too high a temperature is harmful because the longitudinal stretch values drop.

Again, the correct temperature for the third pipe section or preheating zone 7c and the temperatures of the heating chamber 8 will vary depending upon the particular thermoplastic material, the wall thickness of the tubular film and the drawing-off speed. These temperatures can be set approximately from prior experience and general knowledge of biaxial stretching temperatures with a minimum of testing to establish optimum results. For example, the temperature in at least the upper portion of the heating chamber 8 must fall within the biaxial stretching temperature of the thermoplastic polymer being treated while it is preferable to maintain the temperature in the preheating zone and the lower portion of the heating chamber below this biaxial stretching temperature. However, in some cases it is advantageous to maintain all three temperatures within the biaxial stretching range especially with higher melting point polymers or those which have less tendency to become sticky in their stretching. The range of this biaxial stretching temperature, within which the thermoplastic material can be stretched for both longitudinal and transverse molecular orientation, is determined by means of the so-called "Kofler bench" as described in the book entitled "Thermo-mikromethoden" (1954), page 33, by L. and A. Kofler. With this technique, there were found for example the following ranges:

For polyvinyl chloride (with a K-value of 70 and a content of plasticizer of 20% by wt.), a range of 80–130° C.;
For a coplymer of 90% vinyl chloride and 10% vinyl acetate (with a K-value of 60), a range of 85–130° C.;
For a low-pressure polyethylene, a range of 110–140° C.; and
For polypropylene, a range of 110–150° C.

Then, in accordance with the invention, the tubular film is preferably conducted directly from the heating chamber 8 through the calibrating sleeve 28 where the film tube runs in surface contact with the inner wall of the sleeve. By circulating a fluid heat exchange medium in the jacket or shell 29 of this sleeve, it can be maintained at a particular temperature which again depends uopn the particular thermoplastic material. In the case of thin films, e.g. 15 microns, and plasticized shrinkage films, the sleeve is cooled. On the other hand, in the case of thicker and especially hard films such as the copolymers of vinyl chloride, the sleeve must be heated, e.g. to about 30–50° C., in order to avoid the development of folds. The proper temperature in any particular case can be readily determined by routine tests or simply be observing the film as it emerges from the sleeve.

After the fully blown and tempered film tube leaves the sleeve 28, it is collapsed and wound on a take-up reel 35 in known manner, preferably by gradually flattening the tube over a series of oppositely paired rollers 32 down to the usual pinch rolls 34. These pinch rolls are positively driven in order to draw the tubular film through the apparatus at a predetermined rate.

The foregoing embodiment of the process, described in conjunction with FIGS. 1–4, provides a basic explanation of the overall process and apparatus which can be employed to produce tubular films which exhibit a high degree of stretch both in the longitudinal or axial direction and also in the transverse or radial direction. For various purposes, however, it is sometimes quite desirable to obtain a stretching, i.e. an orientation of the film, which is relatively slight in one direction but high in the other direction. It is a special advantage of the invention that one can achieve such preferential or predominant stretching by making only slight changes in the process steps and/or by reassembling the apparatus in a relatively easy manner.

Figure 5:
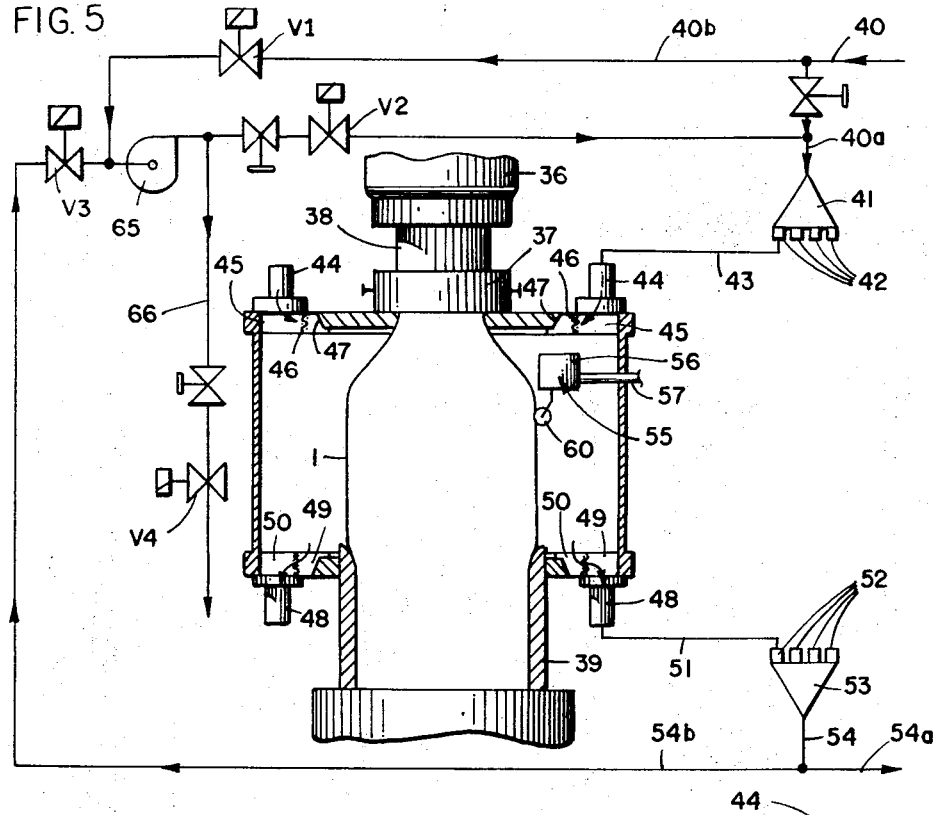
FIG. 5 is a cross-sectional and partly schematic view of the upper portion of the apparatus of the invention, illustrating in greater detail the circulation of cooling air in the pressure chamber and automatically regulated control means to maintain a constant film tube diameter in the pressure zone.
Figure 6:
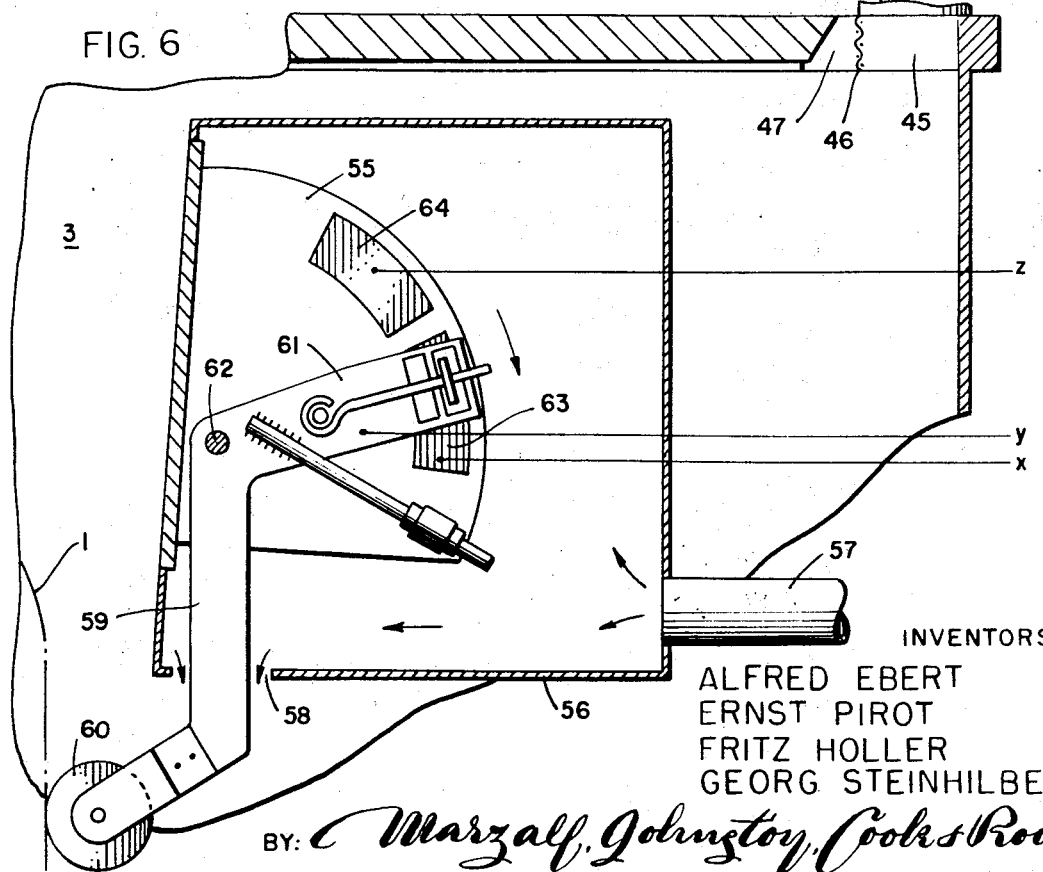
FIG. 6 is an enlarged and partly schematic view of the control switch activated by contact with the film tube in the pressure chamber.

However, regardless of the particular technique employed for heating and stretching the tubular film, it has been found that particularly good results can be achieved in all cases by means of the apparatus shown in FIGS. 5 and 6 for the accurate control of the maximum film tube diameter in the pressure chamber. This apparatus is especially desirable when working with film tubes of relatively large diameter and/or thick walls, and it has a decided value in maintaining the desired flow of cooling air around the inflated film tube in the pressure chamber while still permitting a rapid adjustment of the external counterpressure in the pressure chamber in response to fluctuations in the film tube diameter.

As shown in FIG. 5, the screw extruder 36 is fitted with a conventional annular die plate 37 which contains the annular die slot with a central opening for the inflating or blowing gas introduced through the intermediate blower head 38, all in the same manner as indicated in FIG. 1. Likewise, the upper end of the elongated pipe 39 is essentially the same as described above. The significant features in the apparatus of FIG. 5 are the various lines or conduits which circulate the compressed cooling air and the devices employed to regulate this flow of air.

The initial supply of cooling air enters through line 40 where it normally proceeds through branch line 40a directly to an intermediate storage chamber 41, from which it flows out in streams of equal proportions through a plurality of outlets 42, each of which carries a long conduit 43 running to a corresponding nozzle 44 where the air is injected into the pressure chamber 3. Only one connecting line or conduit 43 has been shown in FIG. 5 for purposes of simplicity, it being understood that each nozzle or entry opening 44 is connected to one of the outlets 42 and that all of the lines 43 have the same cross-sectional dimensions so as to obtain approximately the same flow rate or input through each nozzle 44. Around the upper end of the pressure chamber 3, there is preferably arranged an air distributor ring or manifold 45 having a ring-shaped baffle screen 46 through which the air is blown radially inwardly and is then deflected downwardly by the annular gap 47 onto the film tube 1. The number of storage chamber outlets 42, lines 43 and nozzles 44 should each amount to at least six. Their actual number is dependent upon the diameter of the pressure chamber 3, since the distance between two adjacent nozzles 44 along the ring-shaped distributor 45 should not be greater than about 30 cm. For example, with a diameter of the pressure chamber of about 700 mm., the entry nozzles 44 with a diameter of about 50 mm. would lie on a circle of approximately 650 mm. and six nozzles would not then be sufficient. Therefore, in this particular case, eight nozzles 44 are employed which then have an interval between each other of about 26 cm. The cooling air leaves the pressure chamber 3 through exit outlets 48 which are equal in number to the nozzles 44. Also, it is again preferable to use an annular gap 49 leading radially outwardly into a collecting ring 50 (corresponding to the construction of gap 47 and distributor ring 45). The air then flows in equal proportions through line 51 and the short entry tubes 52 into the storage chamber 53. At this point the cooling gas is exhausted through exit line 54 which is branched into one line 54a exhausting directly to the atmosphere and a second line 54b which can be used for exhausting additional air.

In the pressure chamber 3, there is located a switch 55 fitted into a capsule or small fixed housing 56 in such a manner that it can be continuously washed with small amounts of air, thereby avoiding any fouling of the electrical contacts of the switch over a period of time. Thus air is introduced into the housing 56 through the pipe 57 (see both FIGS. 5 and 6) and exits through slot 58. The lever arm 59 carrying the freely rotatable pin feeler or sensor 60 enters the housing 56 through slot 22 and is pivoted together with contact arm 61 on the pivot point 62. The feeler or sensor 60 rests on the tube 1 at its maximum diameter, so that when the film tube diameter exceeds or falls below the ideal diameter, the electrical contacts 63 or 64 are either closed or opened by the contact arm 61, thereby closing or opening magnetic or solenoid valves through a suitable electric circuit represented by lines $x$, $y$ and $z$.

With this arrangement, it is possible to closely and accurately regulate the counterpressure of the cooling air in pressure chamber 3 as can be explained in connection with FIGS. 5 and 6. Thus, if the diameter of the film tube 1 becomes too small, the contact arm 61 moves in a clockwise direction so that contact 63 is actuated, whereby the solenoid valves V1 and V2 are closed and valves V3 and V4 are opened so that additional air is exhausted from the pressure chamber 3 by fan 65 which draws the air through line 54b and exhausts it through valve V4 in line 66. This reduces the pressure in chamber 3 so that the film tube can expand until the contact arm moves counterclockwise until it reaches the non-conducting portion of the switch 55 between the two contact plates 63 and 64. At this point, there is no electrical contact with the result that valves V1 and V4 are opened and valves V2 and V3 are closed. On the other hand, if the diameter of the film tube becomes too large, the contact arm 61 moves further in a counterclockwise direction to close the circuit over contact plate 64, whereby valves V1 and V2 open and valves V3 and V4 close. These positions of the valves cause additional air to be drawn in from inlet line 40 by fan or blower 65 so that the air in storage chamber 41 is placed under greater compression and the pressure in chamber 3 is likewise increased so that the film tube diameter is decreased.

With reference to FIGS. 1 and 7, it can now be observed that all of the foregoing advantages and improvements with reference to the initial controlled inflation and the structure of the first stage or section of the elongated pipe are preserved while otherwise making minor changes which permit one to predominately stretch or orient the film tube in either its longitudinal or transverse directions.

In order to stretch the film tube predominately in its longitudinal direction, it is merely necessary to omit the heating chamber 8 (FIG. 1) so that the sleeve 28 with its shell 29 is connected directly to the third section 7c of the elongated pipe and has the same diameter, i.e. sleeve 28 simply becomes an added extension or fourth section on the pipe 7. Thus, as shown in FIG. 7, the pipe sections 7a, 7b and 7c remain substantially the same while connecting on a new sleeve 7d of equal diameter enclosed by shell 67 which is provided with an inlet conduit 68 and outlet conduit 69 for the circulation of a fluid cooling medium. In this case, the film tube is treated as before in the first three stages or sections of the elongated pipe 7 but is then cooled in section 7d. Since there is no second inflation chamber, it will be apparent that as the film tube is drawn in the usual manner by the pinch rolls at a rate which exceeds the rate of extrusion, it will be stretched primarily in a longitudinal direction. The heated section 7c of the pipe is preferably heated somewhat higher in this case as compared to its preheating function with a subsequent heating and inflation chamber. Thus, it will be understood that most of the longitudinal stretching occurs in section 7c where the braking pressure or tension exerted by section 7b also has a favorable effect. It is of course possible to achieve some degree of transverse stretching in the pressure chamber 3, but this is quite slight in comparison to the high degree of longitudinal stretch obtained as the tubular film is drawn from heated section 7c through cooled section 7d. After the longitudinal stretching and cooling, the film tube is flattened and collected in the usual manner.

Tubular films or foils which are predominately oriented in the transverse direction can be produced by using the same apparatus as shown in FIG. 1, provided that the braking section 7b of the elongated pipe 7 is either omitted entirely or is nullified by introducing air under a slight excess pressure externally of the tubular film in section 7b. This application of pressure is easily accomplished where section 7b already has a porous structure or is produced to contain a large number of small holes or openings. Furthermore, under this application of pressure rather than a vacuum, section 7b may still contain the textile liner 18 without creating a braking tension on the tube film. In essence, by completely avoiding any braking effect, the elongated pipe connecting the pressure chamber 3 and the heating chamber 8 is reduced two treatment sections or stages instead of three, i.e. a first stage where the tubular film is cooled over at least the first portion thereof and a second stage where the film is preheated before it emerges into the second inflation zone or heating chamber for transverse stretching.

The tubular films obtained according to the various embodiments of the invention do not always have a completely satisfactory stability during storage. For example, due to possible temperature fluctuations during storage or shipment, an after-shrinkage of the highly oriented films can cause distortions of the film and in extreme cases can be even cause damage to the wound spool, especially with very large spools with long running lengths of film stored thereon.

However, in those cases where the film tube stretched according to the invention has a high capacity for after-shrinkage, its quality in this respect can be improved if the flattened tube emerging from the transverse pinch or draw rollers is conducted over a plurality of heated rollers and then over a cooled roller, the peripheral velocity of these additional rollers being reduced in steps or stages from roller to roller to about 5% below the peripheral velocity of the pinch rollers. Thus, as shown in FIG. 8, the film 1 after being flattened by the pinch rollers 34 is conducted over the guide pin or rod 70 and then over four heated rollers 71, 72, 73 and 74 followed by a fifth cooled roller 75. The treated film is preferably contacted first on one side and then the other in each successive roller.

The extent of the shrinkage and the number as well as temperature of these additional rollers will differ for different types of thermoplastic films and with variations in wall thickness, but optimum conditions can be readily determined by simple tests. The gradation of velocity of the heated rolls is preferably adjusted in such a manner that the total shrinkage is equally divided among them, wherein the first heated roller to receive the flat tube can still have the same velocity as the pinch or draw rollers. The temperature of the heated rollers is advantageously about 40° C. to 60° C. (see Example 7).

Through this treatment of the flattened tube prior to its collection on the take-up spool, it receives a controlled after-shrinkage of up to about 5% and does not then exhibit any further deformation during storage on rolls or spools. Also, films or foils which have been obtained with this special treatment and then cut to provide a flat sheet have a surprisingly improved planar orientation.

The process of the invention is further illustrated by the following examples, it being understood that the invention is not limited to such specific process conditions. All percentages expressed in the examples, other than shrinkage values, are by weight. Examples 1–3 use the apparatus of FIG. 1.

EXAMPLE 1

A polyvinyl chloride obtained by suspension polymerization and stabilized with 1.5% dibutyl tin maleinate, with a K-value of 65 and a plasticizer content of 25% dioctylphthalate, is blown with a 60-fold extruder vertically downward through an annular die slot having a 150 mm. diameter and a gap width of 700 microns at a throughput of 36 kg./hr. into a seamless tube 1. This tube enters the pressure chamber 3. The relay 6 regulates the compressed air of approximately 40 mm. water column by control of the valves where air enters through nozzles 4 and emerges through conduits 5, so that the maximum tube diameter at the sensor or feeler of the relay 6 amounts to 320 mm.±5 mm. The first zone 7a of the pipe or passageway 7 is 340 mm. long and has a diameter of 300 mm. The distance of its upper edge or rim 9 from the face of the die 2 is 300 mm. The inner wall of this first pipe section is roughened by sand jets to a roughening depth of 35 to 55 microns and then abraded with sandpaper in order to remove any sharp burrs or edges possibly present so that the surface of the tubular film cannot be harmed. There are no spiral grooves in the wall in this case. The cooling water enters at 12° C. into the shell space 10 of this first zone through line 10a and emerges at 10b. The second zone 7b is 100 mm. long and its interior wall 20 is perforated with holes having a diameter of 1 mm. Over the holes there is stretched a plush or piled fabric of polyester fibers. The vacuum of the shell space 21 is adjusted to 20 mm. water column below atmospheric pressure. The third zone 7c is 200 mm. long and has a slightly roughened surface with a roughening depth of 15 to 20 microns. The inner wall of this third zone is heated to 65° C., since at this temperature of the pipe wall and at a temperature of 92° C. in the upper portion and at 72° C. in the lower portion of the heating chamber 8, which has an inside diameter of 800 mm. and a length of 400 mm., the most favorable "pear shape" is formed on the tube. The calibrating sleeve 28, which is maintained at a temperature of 20° C., has a diameter of 610 mm. and a length of 560 mm. The inside wall of this sleeve is smoothed or polished in order to preserve the surface of the tube. The wall thickness of the tube on entering the first zone 7a is 60 microns and that of the stretched tube on leaving the sleeve 28 is 15 microns. The draw-off speed is 18 m./min. The roller system 32 with the calibrating sleeve 28, the pinch rollers 34 and the take-up roll 35 moves radially about the tube axis, alternating at 270° every three minutes to the right and to the left.

The film obtained under these conditions has a shrinkage in longitudinal and transverse directions of 45 to 48% over the entire production run to complete a conventional roll of film. If the vacuum is not applied in the second zone 7b, the longitudinal shrinkage is only 40%. If zone 7b is removed completely, then the longitudinal shrinkage amounts to only about 25%.

EXAMPLE 2

In this test, there is used a copolymer of 90% vinyl chloride and 10% vinyl acetate with the same annular die slot as in Example 1. The interior pressure of the tube 1 is 90 mm. and the external pressure around the tube in the pressure chamber 3 is 80 mm. (measured as mm. water column above atmospheric pressure), whereby a maximum diameter of the preinflated tube of 315±5 mm. is achieved in chamber 3 and maintained or controlled by the relay 6. The slightly roughened wall (about 20 microns) of the first pipe section or zone 7a, which is 300 mm. long and whose upper edge 9 is 290 mm. away from the face of the die 2, is subdivided by crossed spiral grooves 12 of 0.8 mm. in depth and 0.8 mm. width into rhombic wall surfaces of 5 mm. side length. At the end of this first zone, there is an annular groove or recessed channel 14 with four outlet apertures or conduits 15 which are connected with one another. Through these outlets, the small amount of air coming from the pressure chamber 3 emerges in controlled manner over valve 16, and this throughput of air serves for the formation of an "air cushion" around the tubular film.

The second pipe section or zone 7b corresponds to that of Example 1, but no vacuum is used. Also the third zone 7c is designed as in the previous example, but it is heated to 60° C. The temperature in the upper portion of the heating chamber 8 is 120° C. and that in the lower portion is 100° C. The smooth calibrating sleeve 28 with a diameter of 610 mm. and a length of 560 mm. is maintained at 40° C. With a draw speed of 9 m./min. there is obtained a shrinkage film of 30 microns thickness, this film having very uniform longitudinal and transverse shrinkage values over the entire production run.

EXAMPLE 3

Using the same apparatus as in Example 1, there is extruded a polypropylene melt through an annular die slot of 700 microns gap width and 80 mm. in diameter. The resulting tube 1 is maintained on relay and sensor 6 to a diameter of only 110 mm. This is necessary, because the stretch factor of polypropylene of approximately 1:6 to 1:7 is considerably greater than that of polyvinyl chloride of only 1:2. The internal blowing pressure is 60 mm. and the external pressure in the chamber 3 is 50 mm. water column. The distance of the upper edge 9 of pipe 7a from the face of the die 2 is 150 mm. The three zones of the pipe passage have an inside diameter of only 100 mm., but their lengths are comparatively greater than in Example 1, namely: first zone=680 mm., second zone=200 mm. and third zone=400 mm. The temperature of the third zone is 130° C. Likewise the temperatures of the heating chamber above and below are higher than in Example 1, namely 145° and 130° C., so that there is achieved a good biaxial stretching. The calibrating sleeve 28 with a diameter of 600 mm. and a length of 500 mm. has a temperature of 30° C. The draw speed is 25 m./min. at an extrusion rate of 40 kg./hr. of polypropylene and at a desired film thickness of 15 microns.

EXAMPLE 4

A stabilized, plasticized polyvinyl chloride granulate of a K-value of 60 and having a plasticizer content of 25% is extruded with a 60-fold extruder through an annular die slot of 150 mm. diameter and 0.7 mm. gap space at a throughput of 40 kg./hr. into the pressure chamber 3 wherein the greatest diameter of the initially inflated tube amounts to 390 mm. In the elongated pipe 7 which has a diameter of 360 mm., the tube is treated in three stages:

First, in the double-walled cooling pipe 7a which has a length of 140 mm. and inner wall surfaces containing spiral grooves of 6 mm. depth crossing each other to form rhombic contacting surfaces whose sides measured 5 mm. in length, the mantle or jacket permitting a cooling of the film tube;

Next, in the braking section of the pipe 7b having a length of 200 mm. and also a double-wall jacket wherein the inner wall is perforated with 1 mm. openings and is lined with a felt of 3 mm. thickness; and Finally in the stretching pipe section 7c which has a length of 200 mm., the inner wall surfaces in this case having the same spiral grooves as in section 7a and being maintained at 75° C. by means of thermostats.

While these three stages or sections of the pipe 7 are generally arranged as shown in FIG. 1, the apparatus in this case corresponds closely to that shown in FIG. 7 where the so-called calibrating sleeve 7d is connected directly to the three previous sections of pipe 7 and has the same diameter as each of the preceding sections. The sleeve 7d is 200 mm. long and has its inner wall surfaces roughened by sand jets to a depth of approximately 30–40 microns. The sleeve is cooled at a temperature of 30° C. In this four stage treatment, the heating and inflating chamber 8 of FIG. 1 is omitted and the calibrating sleeve 28 used in the previous examples simply becomes an extension or fourth section of the elongated pipe 7, i.e. as indicated in FIG. 7.

After raising the pressure to 50 mm. water column in the interior of the film tube and with a vacuum of 40 mm. water column in the jacket or shell 21 of the braking section 7b, a foil of 15 microns thickness is obtained with a shrinkage value of 45% in the longitudinal axis and only 8% in the transverse axis.

By retarding the drawing-off speed to one-half of its original value, a 30 micron foil is obtained with the same shrinkage data; the interior pressure on the tube increased in this case from the former 50 mm. value up to 80 mm. (water column).

EXAMPLE 5

A stabilized copolymer of 90% vinyl chloride and 10% vinyl acetate of the K-value of 60 is extruded at a throughput of 40 kg./hr. with a 60-fold extruder having an annular die slot of 150 mm. diameter and a gap space of 0.8 mm. into the pressure chamber 3 to form a primary or initial tube of 30 microns thickness. The maximum diameter of the tube in this pressure chamber amounts to 320 mm. The film tube is led into the cooling pipe 7a (length=140 mm., diameter=300 mm.), which is maintained at 50° C. The inner wall of the pipe section 7a is provided with crossing grooves so as to yield rhombic panels or contacting surfaces of 4 mm. length on each side and 0.8 mm. deep. Thereafter, the film tube runs through the pipe section 7b having an inner wall 17 produced from sintered metal and lined on the inner side with a velvet fabric composed of polyester fibers (see FIG. 4). The space 21 between the walls of pipe section 7b are kept under a pressure of 20 mm. water column. Next, the film tube is conducted into the pipe section 7c which is 100 mm. long and maintained at 70° C., after which the tube passes into the heating chamber 8 (diameter=800 mm., length=400 mm.) which is heated by infrared radiation to 120° C. in the upper portion and 100° C. in the lower portion. The stretched tube is then calibrated in a jacketed sleeve 8 of 600 mm. diameter at 40° C., and then wound up with a film thickness of 15 microns. The film has a shrinkage value of 55% in the transverse axis and 10% in the longitudinal axis. The apparatus for this example of predominately orienting the film in its transverse direction essentially corresponds to that shown in FIGS. 1–4.

EXAMPLE 6

The same procedure is followed as in Example 5 up to the pipe section 7a. Thereafter, the tubular film is conducted directly from section 7a into section 7c by omitting section 7b entirely. Thus, pipe section 7c becomes the second stage or treatment zone. The tubular film is otherwise treated exactly as in Example 5. The shrinkage in the longitudinal axis amounts to 15% in this case, while the transverse shrinkage remains the same.

EXAMPLE 7

The film tube produced according to Example 2, while being collapsed and laid flat, leaves the pinch rolls 34 at a peripheral velocity of therolls of 9 meters/minute. The film at this point is 30 microns thick. Then, the tube is conducted over four rollers heated to 50° C. (see FIG. 8). The peripheral velocity of the rollers had been adjusted to 9 meters/min., 8.9 meters/min., 8.8 meters/min. and 8.7 meters/min. Then the flat tube is drawn off at a speed of 8.7 meters/min. on a pair of rollers of which one had been cooled to 12° C. There results a tubular film with a wall thickness of 33 microns which is highly stable during storage. The foils produced by cutting up this foil have an especially good planar condition.

While the process and apparatus of the invention are especially advantageous for blowing films of polyvinyl chloride, vinyl chloride copolymers and polyolefins such as polyethylene and polypropylene, the invention is also adaptable and quite practical for film production from other thermoplastic polymers. Exact processing conditions in terms of the degree of stretching and the temperatures required at various points in the process naturally depend on the type of thermoplastic material as well as its extruded wall thickness and the amount of stretch imparted thereto. Also, in addition to plasticizers, the polymers may contain other additives such as pigments, antioxidants and the like. Therefore, the invention is not limited to specific stretching values or temperatures other than those which would be considered best suited to an individual thermoplastic material. The improvement achieved herein is instead predicated upon the construction and arrangement of the apparatus or the particular processing techniques as defined by the appended claims.

The invention is hereby claimed as follows:

1. In a process for extruding and biaxially stretching a tubular thermoplastic film wherein the film tube is subjected to transverse stretching by controlled inflation with a gas entering the film tube centrally of its annular extrusion point and is subjected to longitudinal stretching by drawing the extruded film tube through pinch rolls which also flatten the tube at a spaced distance from the point of extrusion in order to close the tube for inflation, the steps comprising:

first inflating the initially extruded tubular film to about 1.2 to 3 times its initial extrusion diameter and to a maximum diameter which is about 5 to 10 percent greater than the diameter of an elongated tubular passageway through which the tubular film is subsequently passed, in an enclosed pressure zone through which a cooling gas is circulated externally of the film tube under a counterpressure sufficient to limit the inflation of the film tube;

necking down the initially extruded and inflated tube from said pressure zone through said elongated tubular passageway having at least a first stage in which the tubular film is further externally cooled while reducing its surface contact and adhesion to the inner wall of the passageway;

subsequently reheating said film tube before it is flattened and stretching said reheated tube in at least one of its longitudinal and transverse direction; and finally collecting the stretched and flattened film tube.

2. A process as claimed in claim 1 wherein the length of the tubular film in said pressure zone is not greater than its maximum diameter in this zone.

3. A process as claimed in claim 1 wherein a controlled amount of air is passed through grooved channels along the inner wall of said first stage of the tubular passageway and externally of the tubular film therein to reduce the surface contact of the film with said inner wall.

4. A process as claimed in claim 1 wherein said cooling gas is introduced into said pressure zone in the form of at least six separate but equally strong streams and is withdrawn from said pressure zone in approximately the same number of separate streams.

5. A process as claimed in claim 4 wherein the pressure of the cooling gas in the pressure zone is regulated in response to variations of the maximum film tube diameter in said pressure zone so as to maintain this diameter approximately constant.

6. A process as claimed in claim 1 wherein said film tube after being flattened by said pinch rollers and before being collected is conducted over a plurality of heated rollers for the reduction of after-shrinkage of the film and then over a cooled roller, the peripheral velocity of such additional rollers being reduced stagewise up to about 5% below the peripheral velocity of said pinch rollers.

7. A process as claimed in claim 1 wherein said initially extruded film tube is first slightly preinflated in said pressure zone and is further inflated while being heated in a second inflation zone under a substantially atmospheric pressure, the film tube being conducted from said pressure zone to said second inflation zone through said tubular passageway in which the film tube is treated in three stages consisting of:

(a) said first stage, (b) a second stage where braking pressure is applied to the tubular film through the wall surface of the passageway, and (c) a third stage where the tubular film is preheated prior to emergence into said second inflation zone.

8. A process as claimed as claim 7 wherein the length of the tubular film in said pressure zone is no greater than its maximum diameter in this zone.

9. A process as claimed in claim 7 wherein said tubular film is conducted from said second inflation zone through a calibrating tube maintained at a temperature sufficient to fix the diameter of the tubular film at an approximately constant value.

10. A process as claimed in claim 7 wherein the braking pressure in said second stage is at least in part achieved by surface contact of the film tube with the protruding fibers of a textile liner covering the inner wall surfaces of said second stage.

11. A process as claimed in claim 7 wherein a vacuum is applied through a permeable wall surface of said second stage of the tubular passageway for application of a braking pressure.

12. A process as claimed in claim 1 for the production of a tubular film which is predominately oriented in its longitudinal direction wherein said initially extruded film tube after being inflated in said pressure zone is necked down and drawn through said tubular passageway in which it is treated in four stages of equal diameter consisting of:
(a) said first stage,
(b) a second stage where braking pressure is applied to the tubular film through the wall surface of the passageway,
(c) a third stage where the tubular film is heated for longitudinal stretching, and
(d) a fourth stage where the tubular film is again cooled prior to being flattened and collected.

13. A process as claimed in claim 1 for the production of a tubular film which is predominately oriented in its transverse direction wherein said initially extruded film is first slightly preinflated in said pressure zone and is further inflated while being heated in a second inflation zone under a substantially atmospheric pressure, the film tube being conducted from said pressure zone to said second inflation zone through said tubular passageway in which the film tube is treated in two stages consisting of:
(a) said first stage where the tubular film is cooled over at least the first portion thereof, and
(b) a second stage where the tubular film is preheated prior to its emergence into said second inflation zone while reducing its surface contact and adhesion to the inner wall of the passageway.

14. A process as claimed in claim 13 wherein air under excess pressure is introduced externally of the tubular film in at least the second and remaining portion of said first stage.

15. A process as claimed in claim 13 wherein said film tube after being flattened by said pinch rollers and before being collected is conducted over a plurality of heated rollers for the reduction of after-shrinkage of the film and then over a cooled roller, the peripheral velocity of such additional rollers being reduced stagewise up to about 5% below the peripheral velocity of said pinch rollers.

References Cited

UNITED STATES PATENTS

| | | | |
|---|---|---|---|
| 2,603,838 | 7/1952 | Lowry et al. | 264—346 X |
| 2,947,032 | 8/1960 | Taylor | 18—14 |
| 2,987,767 | 6/1961 | Berry et al. | 264—95 |
| 3,218,380 | 11/1965 | Euling et al. | 264—95 |
| 3,274,314 | 9/1966 | Hudson et al. | 264—95 X |

FOREIGN PATENTS 1,366,077  6/1964  France.

ROBERT F. WHITE, Primary Examiner

J. H. SILBAUGH, Assistant Examiner

U.S. Cl. X.R.

18—14; 264—95, 235, 342, 346